[19] United States Patent
Banzai et al.

[11] Patent Number: 5,325,038
[45] Date of Patent: Jun. 28, 1994

[54] DRIVING APPARATUS FOR CONTROLLING AN ELECTRIC LOAD IN A VEHICLE

[75] Inventors: Keiichiro Banzai, Toyota; Koshi Torii, Iwakura; Toshitaka Tanahashi, Okazaki, all of Japan

[73] Assignee: Nippondenso Co., Ltd., Kariya, Japan

[21] Appl. No.: 894,768

[22] Filed: Jun. 10, 1992

[30] Foreign Application Priority Data

Jun. 10, 1991 [JP] Japan ........................... 3-138011
Jun. 25, 1991 [JP] Japan ........................... 3-153371

[51] Int. Cl.$^5$ ............................................. H02J 7/14
[52] U.S. Cl. .......................................... 320/6; 320/13; 320/15
[58] Field of Search .................. 320/6, 13, 15, 61, 64, 320/68

[56] References Cited

U.S. PATENT DOCUMENTS

| | | | |
|---|---|---|---|
| 3,949,289 | 4/1976 | Day | 320/6 |
| 4,044,293 | 8/1977 | Follmer | 320/15 |
| 4,127,782 | 11/1978 | Omura et al. | 320/6 X |
| 4,207,511 | 6/1980 | Radtke | 320/6 |
| 4,684,814 | 8/1987 | Radomski | 320/6 X |
| 4,902,956 | 2/1990 | Sloan | 320/13 |
| 5,136,230 | 8/1992 | Gayler | 320/13 |
| 5,138,246 | 8/1992 | Kobayashi | 320/13 |
| 5,175,484 | 12/1992 | Witehira et al. | 320/6 |

FOREIGN PATENT DOCUMENTS

| | | |
|---|---|---|
| 59-96416 | 6/1984 | Japan . |
| 1244110 | 9/1989 | Japan . |
| 2277916 | 11/1990 | Japan . |
| 2174558 | 11/1986 | United Kingdom ............... 320/6 |

OTHER PUBLICATIONS

SAE Technical Paper Series No. 900503, W. A. Whittenberger et al., Mar. 2, 1990 pp. 61-70.

Primary Examiner—Kristine L. Peckman
Attorney, Agent, or Firm—Cushman, Darby & Cushman

[57] ABSTRACT

The present invention supplies electric power from a battery to a starter and other specific electrical loads which are driven together with the starter with reduced power requirements on the battery. A driving apparatus for controlling an electric load is provided with a battery (1) for supplying the electric power to a starter motor (3) and an electric heater (20) which is attached to a catalyst for cleaning up exhaust gases from the engine. The terminal voltage of the battery (1) during starter motor (3) operation is detected, and the rate of on-off operation to supply the current to the electric heater (20) is controlled by means of a heater controller (5) in accordance with the detected terminal voltage. This conduction timing control is effected by a control circuit (40), being started a first specific time after the start of operation of the starter motor (3) and being ended a second specific time after the end of operation of the starter motor (3).

9 Claims, 12 Drawing Sheets

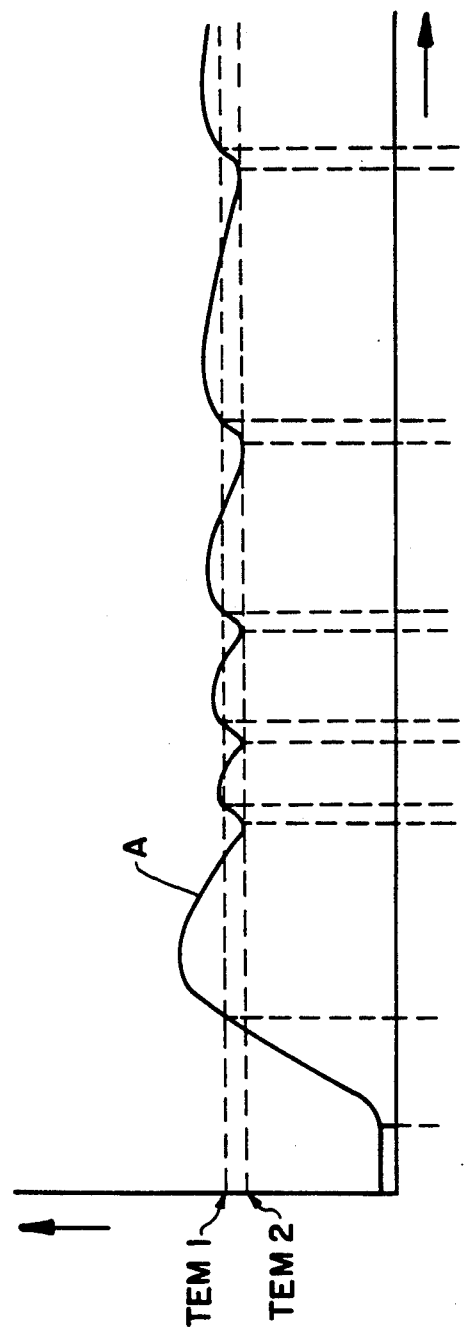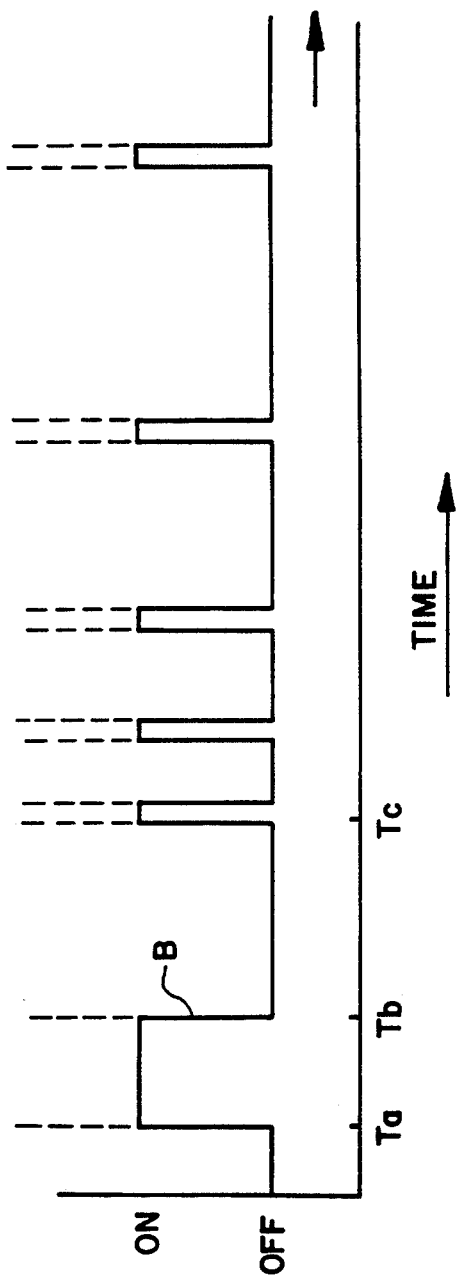
FIG. 12A
TEMPERATURE OF METALLIC-SUPPORT CATALYST
FIG. 12B
OPERATING CONDITION OF POWER SWITCH ELEMENT

DRIVING APPARATUS FOR CONTROLLING AN ELECTRIC LOAD IN A VEHICLE

CROSS REFERENCE TO RELATED CASES

Reference is made to copending application Ser. No. 07/319,575 entitled "Parallel Path Catalytic Converter".

BACKGROUND OF THE INVENTION

The present invention relates to a driving apparatus for electric load on vehicle equipped with specific electrical loads which are driven together with a starter.

Description of Related Arts

In motor vehicles a catalyst is used to clean up exhaust gases for the purpose of preventing environmental pollution. There is such a prominent problem, however, that when a cold engine is started and the catalyst is at a low temperature, the catalyst fails to fully trap combustible exhaust gases of fuel, allowing the exhaust gases to enter the atmosphere. As a technological means for solving the above-mentioned problem, there has been proposed a method using a catalyst device with an electric heater which is energized at the time of engine starting to ensure complete combustion of combustible fuel (for example in SAE paper 900503 and Japanese Patent Laid-Open No. Hei 3-202614).

The method stated above, however, has the problem that since the electric power is supplied from a battery mounted on the vehicle to an electric heater and a starter, the battery is likely to be overburdened.

It is therefore an object of the present invention to provide a driving apparatus for controlling an electric load in a vehicle, for reducing battery load and supplying the power from the battery to both the starter and specific electrical loads.

SUMMARY OF THE INVENTION

One aspect of a driving apparatus for controlling an electric load in a vehicle according to the present invention is characterized by controlling the amount of current to be supplied to specific electrical loads so that a starter motor will be supplied with the electric current preferentially, in accordance with the discharging condition of a battery during starter operation.

Another aspect of the driving apparatus for controlling an electric load in a vehicle according to the present invention is characterized by delaying the supply of the electric current to specific electrical loads in relation to the supply of the electric current to the starter motor.

Still another aspect of the driving apparatus controlling an electric load in a vehicle according to the present invention is characterized in that a specific electrical load is a heater for heating a catalyst such that a catalyst heating temperature will be properly controlled in order to prevent the excess supply of the electric current to the catalyst.

According to one aspect of the present invention, since the amount of current to be supplied to specific electrical loads is so controlled as to supply the electric power in accordance with battery capacity, it is possible to supply the electric current to the starter motor and specific electrical loads while reducing a burden on the battery. At this time, as the electric current is supplied preferentially to the starter motor, it is possible to start the engine smoothly without disruption.

Furthermore, according to another aspect of the invention, since the electric current is not simultaneously supplied to both the starter motor and specific electrical loads, an instantaneous excessive current discharge is not demanded on the battery, thereby avoiding adverse effects to battery life.

Furthermore, according to still another aspect of the invention, excessive current supply to the motor can be prevented, thus reducing the load on the battery.

The foregoing object and other objects of the driving apparatus according to the present invention will become more apparent and understandable from the following detailed description thereof, when read in connection with the accompanying drawings.

BRIEF DESCRIPTION OF THE DRAWINGS

FIG. 12 is a time chart for explaining operation; and

DESCRIPTION OF THE PREFERRED EMBODIMENTS:

Hereinafter an exemplary embodiment of a driving apparatus for controlling an electric load according to the present invention will be described with reference to the accompanying drawings.

First Embodiment

Figure 1:
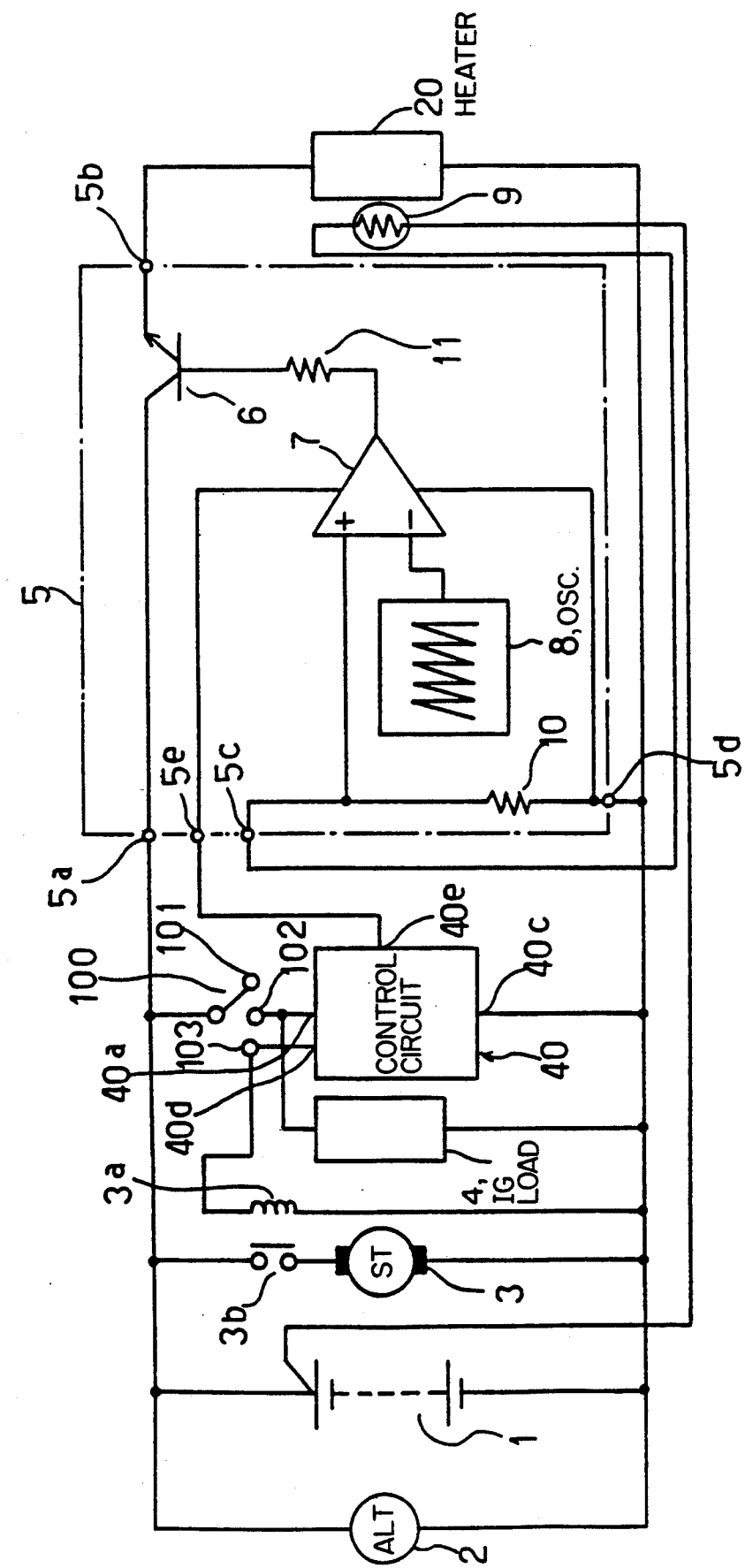
FIG. 1 a block diagram of the first embodiment according to the present invention.

FIG. 1 shows the first embodiment of the driving apparatus for controlling an electric load according to the present invention. In this drawing, a numeral 1 refers to a battery, and a numeral 2 denotes an alternator driven by an engine, which generates and outputs an alternating current after rectification.

A numeral 3 is a starter motor for starting the engine, and is connected to the battery 1 via a starter contact 3b which is opened and closed by an exciting coil 3a. A numeral 5 represents a current quantity control means for controlling, by a transistor 6, the amount of current to be supplied to the electric heater (a specific electrical load) attached to a catalyst, and has terminals 5a to 5e.

In this current quantity control means 5, a numeral 7 refers to a comparator, the output side of which is connected to the base of the transistor 6 through a resistor 11. A numeral 8 refers to a triangular wave reference oscillator, which is connected to the negative input terminal of the comparator 7. A numeral 9 is a temperature sensor having a temperature coefficient of positive characteristics which is connected in series to a resistor 10, mounted in close contact with the heater 20 to detect the temperature of the heater 20.

Figure 2:
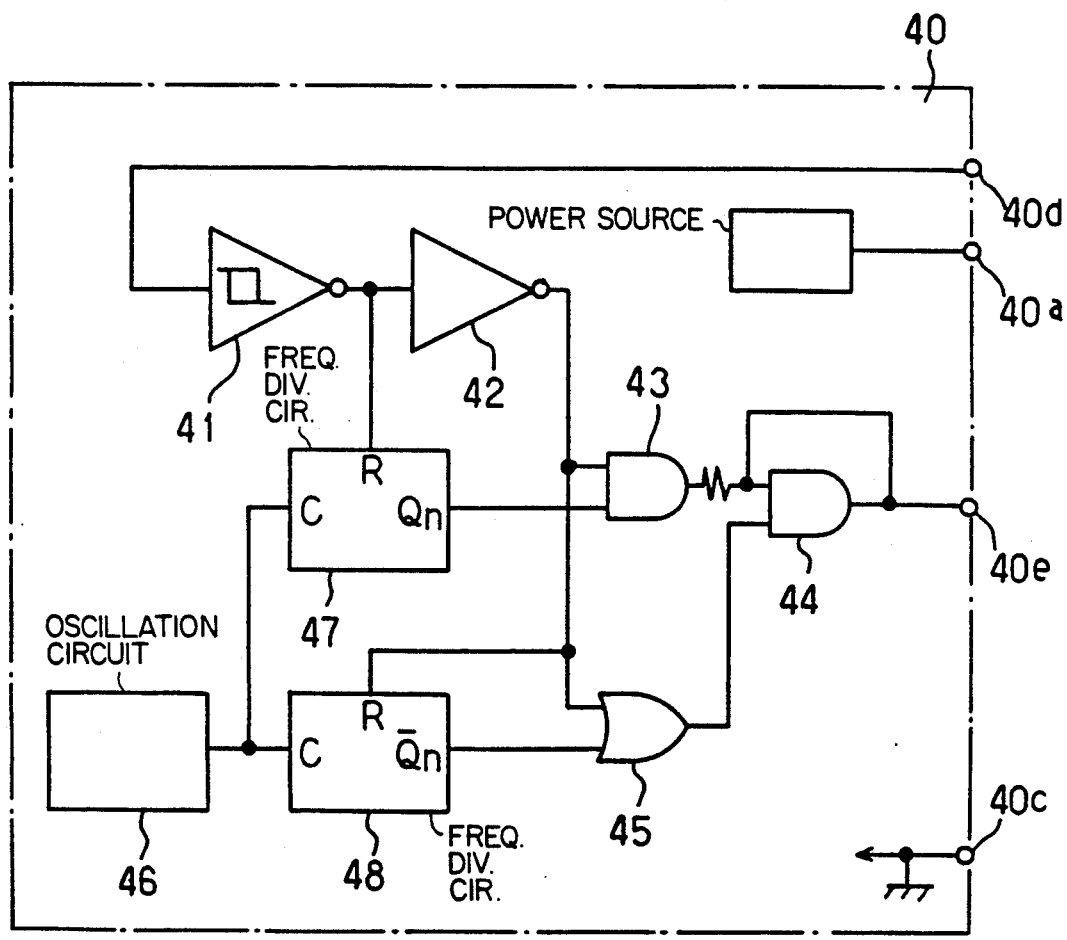
FIG. 2 is an electric circuit diagram of a control circuit in FIG. 1.

A numeral 40 denotes a control circuit, shown in detail in FIG. 2, which controls the supply of electric power to the comparator 7 of the current quantity control means 5. A numeral 100 expresses an ignition switch as a means for starting the engine; a numeral 101, an off position; a numeral 102, an IG position; and a numeral 103, a starter motor starting position.

FIG. 2 is an electric circuit diagram of the control circuit 40. A numeral 41 is a Schmitt trigger input inverting circuit; and a numeral 42, an inverting circuit. The terminal 40d is connected to a starter motor starting position 103 of the ignition switch 100. Numerals 43 and 44 indicate AND circuits, and a numeral 45, an OR circuit. The output side of the AND circuit 44 is connected to the terminal 5e of the current quantity control means 5 through the terminal 40e. The frequency dividing circuits 47 and 48 each have a clock terminal C, a reset terminal R, and output terminals Qn, −Qn. The clock terminal frequency dividing circuit is connected to the output side of the oscillator circuit 46, and the reset terminals R of the circuits 47 and 48 are connected to the output side of the inverting circuits 41 and 42, respectively. The output terminals of the circuits 47 and 48 are connected to the input side of the AND circuit 43 and the OR circuit 45, respectively. The terminal 40a is a power supply terminal, and the terminal 40c is a ground terminal.

Next, the mode of operation of the driving apparatus for electric load of the above-described constitution will be explained. In FIG. 1, the ignition switch 100 is turned to the starter motor starting position 103 to operate the starter motor 3 in order to start the engine not illustrated. At this time the control circuit 40 outputs a signal described later for operating the heater 20, from the terminal 40e to the current quantity control means 5, for cleaning up the exhaust gas, that is, for complete combustion of combustible fuel. Since both the starter motor 3 and the heater 20 are large consumers of electric power, the battery 1 is required to supply a heavy current.

Here, the current quantity control means 5 compares the divided battery terminal voltage with the triangular wave reference voltage; if the terminal voltage of the battery 1 drops below a predetermined value, at the time of excessively high discharge, due to a run-down or insufficiently charged battery 1, the transistor 6 is de-energized to prevent excessive terminal voltage drop caused by the discharge of the battery 1, and also to prevent the malfunction of the motor, relay, and electric circuit connected to the battery terminals.

In the event of battery 1 voltage drop, the rate of output continuity of the comparator 7 will lower, resulting in a decrease in the amount of current flowing in the transistor 6. The temperature sensor 9 is a temperature sensor having a temperature coefficient of positive characteristics, which detects the temperature of the heater 20. At a low temperature of the heater 20, the value of resistance is low, but with a rise in the heater 20 temperature, the value of resistance rises also. Consequently, with the temperature rise of the heater 20, the positive input terminal voltage of the comparator 7 drops, and accordingly the amount of current flowing in the transistor 6 decreases to limit the supply of the electric power, thereby holding the temperature of the heater 20 at a predetermined value in order to prevent the heater 20 from overheating and further to prevent excessive consumption of the electric power.

In the above-described operation, in the control circuit 40, when the ignition switch (hereinafter referred to as the IG SW) 100 is turned to the starter motor starting position 103, the output of the inverting circuit 42 disclosed in FIG. 2 becomes the "1" level and at the same time the reset terminal of the frequency dividing circuit 48 also changes to the "1" level. Accordingly the frequency dividing circuit 48 is reset and the output at the inverting output terminal −Qn becomes the "1" level, and the output of the OR circuit 45 also becomes the "1" level.

In the meantime, the output of the inverting circuit 41 is at the "0" level while the output of the inverting circuit 42 is of the "1" level. Thus, the reset terminal R receives the "0" level to start the operation the frequency dividing circuit 47, which will output a "1" level to the output terminal Qn after a specific period of time (for example about one second). Therefore the output of the AND circuits 43 and 44 becomes the "1" level, allowing the operation of the current quantity control means 5 through the terminal 40e. At this time the current quantity control means 5 functions to control the amount of current to be supplied to the heater so that the battery voltage will not drop below the specific value, in accordance with the battery 1 voltage and the heater temperature.

When the IG.SW is turned back to the IG position 102 after starting the engine, the outputs of the inverting circuits 41 and 42 become the "1" and "0" levels respectively, the reset terminal R of the frequency dividing circuit 47 becoming the "1" level and accordingly the output terminal Qn becoming the "0" level. The output of the AND circuit 43 becomes the "0" level, but the output of the AND circuit 44 remains at the "1" level as it is self-held by feeding back the output signal to the input terminal. The frequency dividing circuit 48 begins its operation as the reset terminal R becomes the "0" level, thence making the inverting output terminal −Qn become the "0" level after a specific period of time (for example about 20 seconds) necessary for heating the catalyst. Then the output of the AND circuit 44 becomes the "0" level, inhibiting the operation of the current quantity control means 5.

Second Embodiment

Figure 3:
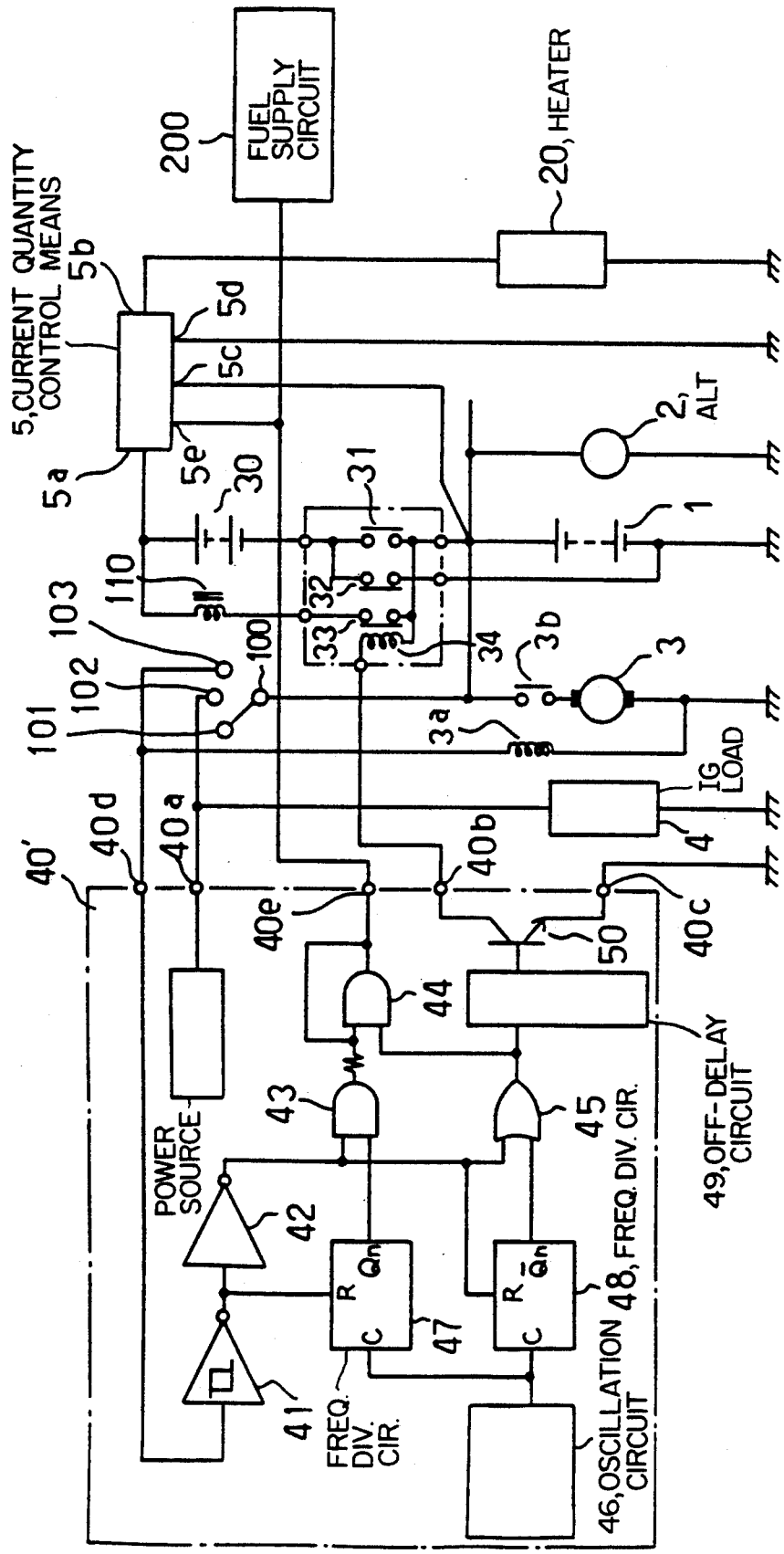
FIG. 3 is a block diagram of the second embodiment according to the present invention.

FIG. 3 is an electric circuit diagram showing a second embodiment of the present invention. In this drawing, a numeral 30 refers to a second battery; numerals 31, 32 and 33 denote changeover switches by which a first battery 1 and a second battery 30 of a smaller capacity than the first battery 1 are connected in series or in parallel; and a numeral 34 represents an exciting coil of these switches. A numeral 40' denotes a control circuit comprising the control circuit 40 of the first embodiment added with an off-delay circuit 49 for delaying for a preset period of time the off-time operation and a transistor 50 for driving the exciting coil 34 through a terminal 40b.

A numeral 110 is a current limiting reactor for preventing the flow of an excessive current at the time of operation of the switch 33; and a numeral 200 is a fuel supply circuit, which is allowed to operate after the electric current is supplied to the current quantity control means 5, supplying the fuel to the engine. The current quantity control means is one similar to the first embodiment.

Next, the operation of the driving apparatus for controlling the electric load of the above-described arrangement will be explained. When the IG.SW 100 is turned to the starter motor starting position 103 to crank the engine, the exciting coil 3a is energized to close the contact 3b, thus turning the starter motor 3 to start the engine. At the same time, the control circuit 40' closes the contact 31, connecting the battery 1 and the battery 30 in series.

That is, since the reset terminal R of the frequency dividing circuit 48 becomes the "1" level simultaneously with the change of the output of the inverting circuit 42 to the "1" level, the frequency dividing circuit 48 in the control circuit 40' is reset to convert the output of the inverting output terminal —Qn to the "1" level. As a result, the output of the OR circuit 45 becomes the "1" level, turning on the transistor 50 to excite the exciting coil 34. Consequently, the contact 31 is closed and the contact points 32 and 33 are opened, connecting the battery 1 and the battery 30 in series. The current quantity control means 5 is allowed to operate at the same points by the operation of the frequency dividing circuit 47 as the circuit shown in FIG. 2.

When the engine is started, two batteries are connected in series, and then the current quantity control means 5 operates to supply the current to the heater 20. At this time, since the current quantity control means 5 and the heater 20 are applied with a high voltage, the current can be decreased, and accordingly it is possible to make smaller in size the transistor 6 which is shown in FIG. 1 as a current quantity control element of the current quantity control means. In the present embodiment, the current quantity control means 5 controls the amount of current to be supplied to the heater 20 as described above, by directly monitoring the battery 1 voltage, so that the battery voltage will not drop below a present value.

When the IG.SW is turned back to the IG position 102 after engine starting, the control circuit 40' operates in a similar manner as the circuit of FIG. 2; and after a predetermined period of time has passed, the inverting output terminal —Qn of the frequency dividing circuit 48 becomes the "0" level and the output of the AND circuit also becomes the "0" level, thus inhibiting the operation of the current quantity control means 5. In the meantime, the transistor 50 is turned off with a lag of a specific time (for example about 1 second) by the operation of the off-delay circuit 49 after the output of the OR circuit 45 has changed to the "0" level. That is, after the engine has started, the supply of current to the heater 20 is controlled for a specific period of time. After the current supply is cut off, the battery connection is changed over from a series to a parallel connection. The current limit reactor 110 prevents the excessive flow of the charging current when the battery 30 is changed over from the series to the parallel connection, thereby enabling preventing a damage of a contact likely to be caused by a rush current and preventing a rotational change accompanied by a sudden increase in engine load resulting from an abrupt increase in the amount of current generated by the alternator.

Third Embodiment

Figure 4:
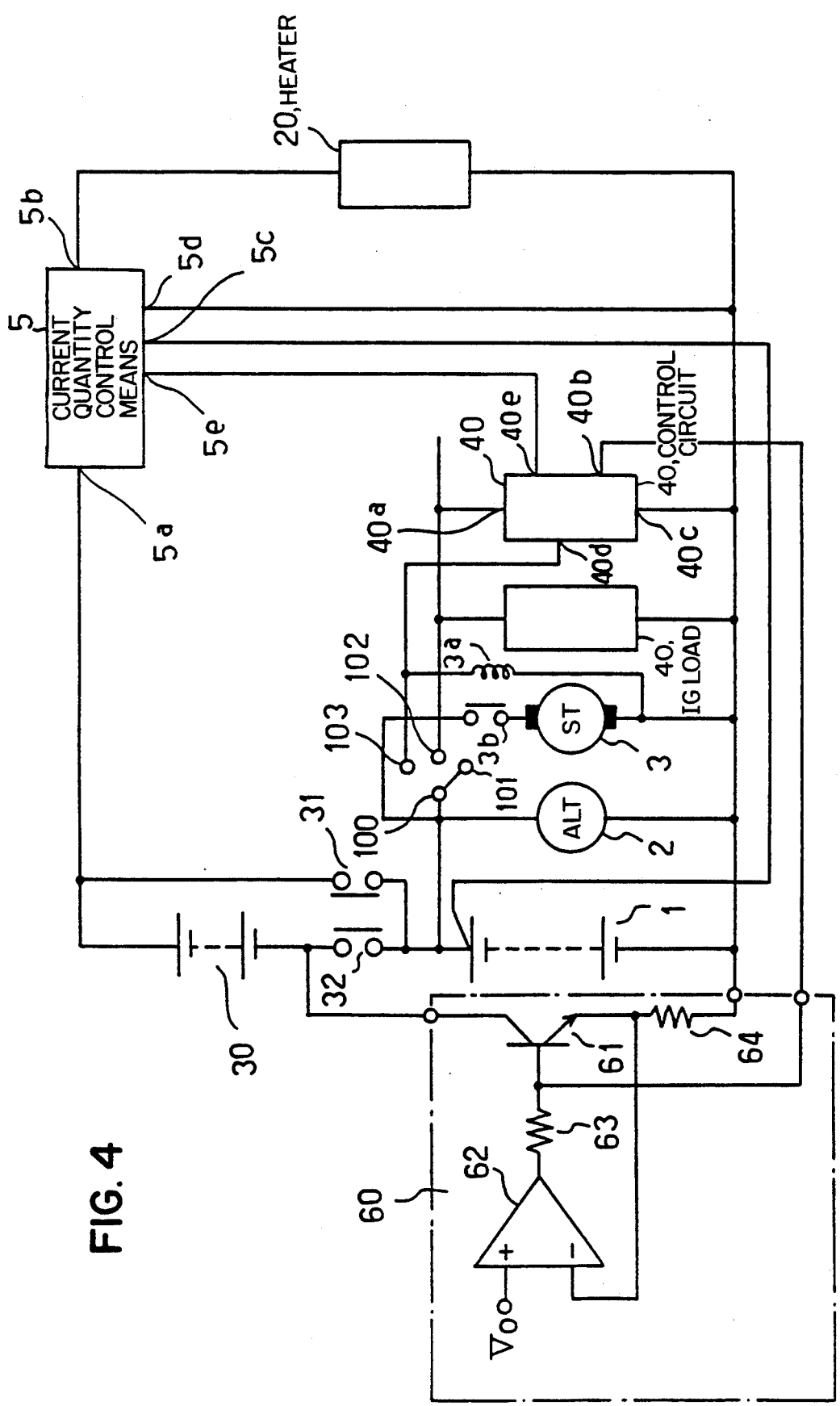
FIG. 4 is a block diagram of the third embodiment according to the present invention.

FIG. 4 shows a third embodiment of the driving apparatus for electric load for controlling an use in the present invention, giving another example of an arrangement for limiting the excessive flow of charging current which flows when the battery has been changed over from the series to the parallel connection. In this drawing, reference numeral 60 refers to a constant-current circuit; numeral 61, a transistor; a numeral 62, an OP amplifier; and numerals 63 and 64, resistors. In the constant-current circuit of the above-mentioned arrangement, if the current flowing in the transistor 61 increases, the terminal voltage of the resistor 64 rises and the output voltage of the OP amplifier 62 is decreased to limit the current. Other circuit constitution is the same as that of the second embodiment.

Fourth Embodiment

Figure 5:
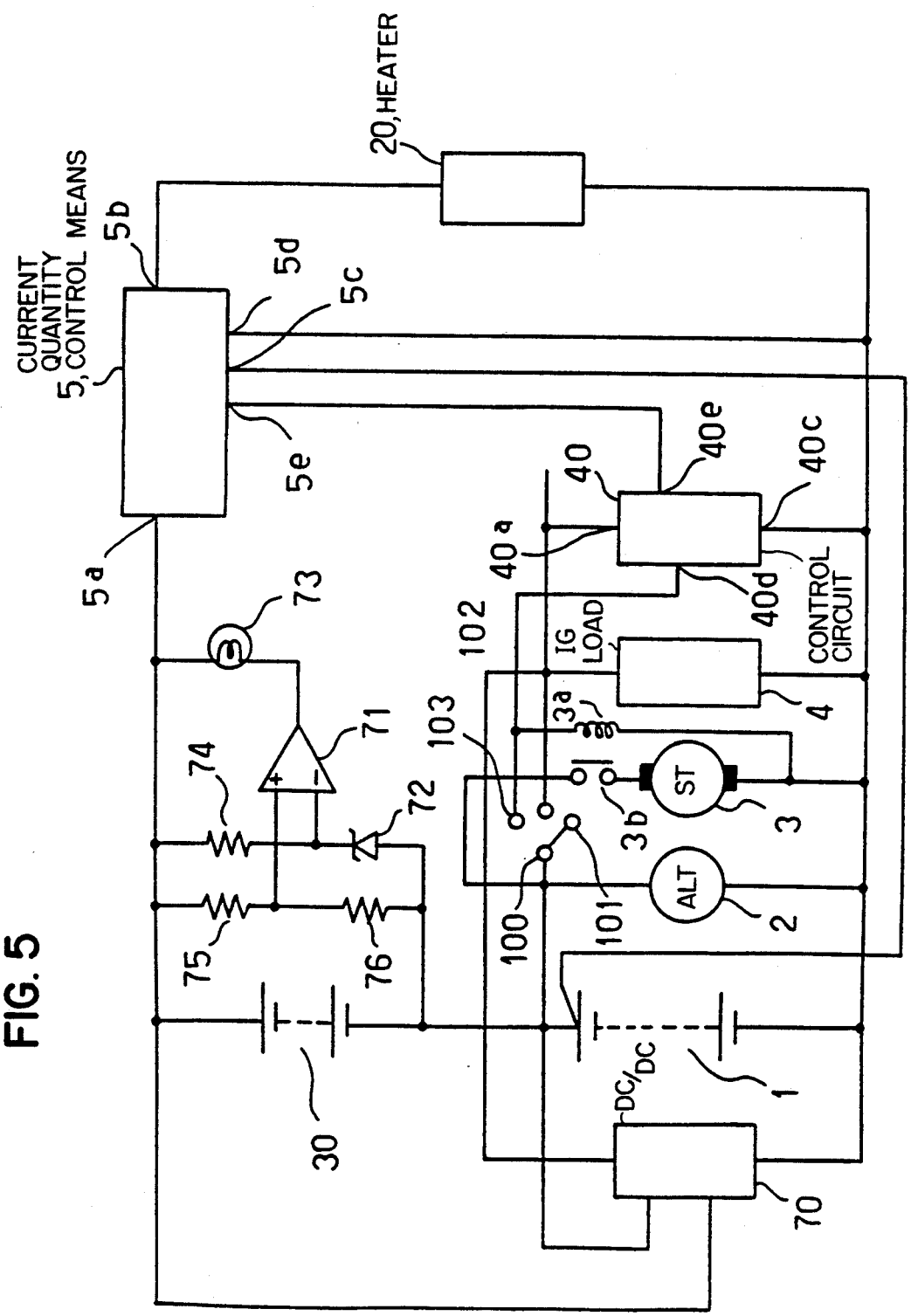
FIG. 5 is a block diagram of the fourth embodiment according to the present invention.

FIG. 5 shows a fourth embodiment of the driving apparatus for controlling an electric load according to the present invention. In this drawing, a numeral 70 refers to a DC-to-DC converter, which, receiving the voltage from the large-capacity battery 1 for driving the starter motor, outputs an increased voltage, at which a charge is made to the battery 30 of smaller capacity than the battery 1. Consequently, the aforementioned switches 31, 32 and 33 (see FIG. 3) for changing the battery 1 and the battery 30 from a series to a parallel connection or vice versa will become unnecessary. The comparator circuit comprising a comparator 71, a Zener diode 72, and resistors 74, 75 and 76 forms a low-voltage detecting-warning circuit of the battery 30. When the voltage of the battery 30 is lower than a specific value, the output of the comparator 71 becomes the "0" level, turning on the lamp 73 to give a warning. Other circuit arrangements are similar to that of the second embodiment.

In the above-described embodiment, as a means for detecting the discharging state of the battery, there is used a means for judging "over discharge" when the battery terminal voltage has dropped below the specific value, thereby limiting the current flowing to the heater. In this case, a similar effect can be obtained by detecting the current condition that the predetermined amount of current can not flow when the detected discharge current from the battery is below a specific value, that is, when the battery terminal voltage has dropped due to the decreased discharge current, and by limiting the flow of the current to the heater.

Furthermore, if the time to limit the flow of the current to the heater continues for a specific time (for example 10 seconds) or over, the heater temperature will not reach the specific value and accordingly the exhaust gas will not completely burn. At this time, therefore, it is desirable that a warning be given to a driver of the vehicle.

Figure 6:
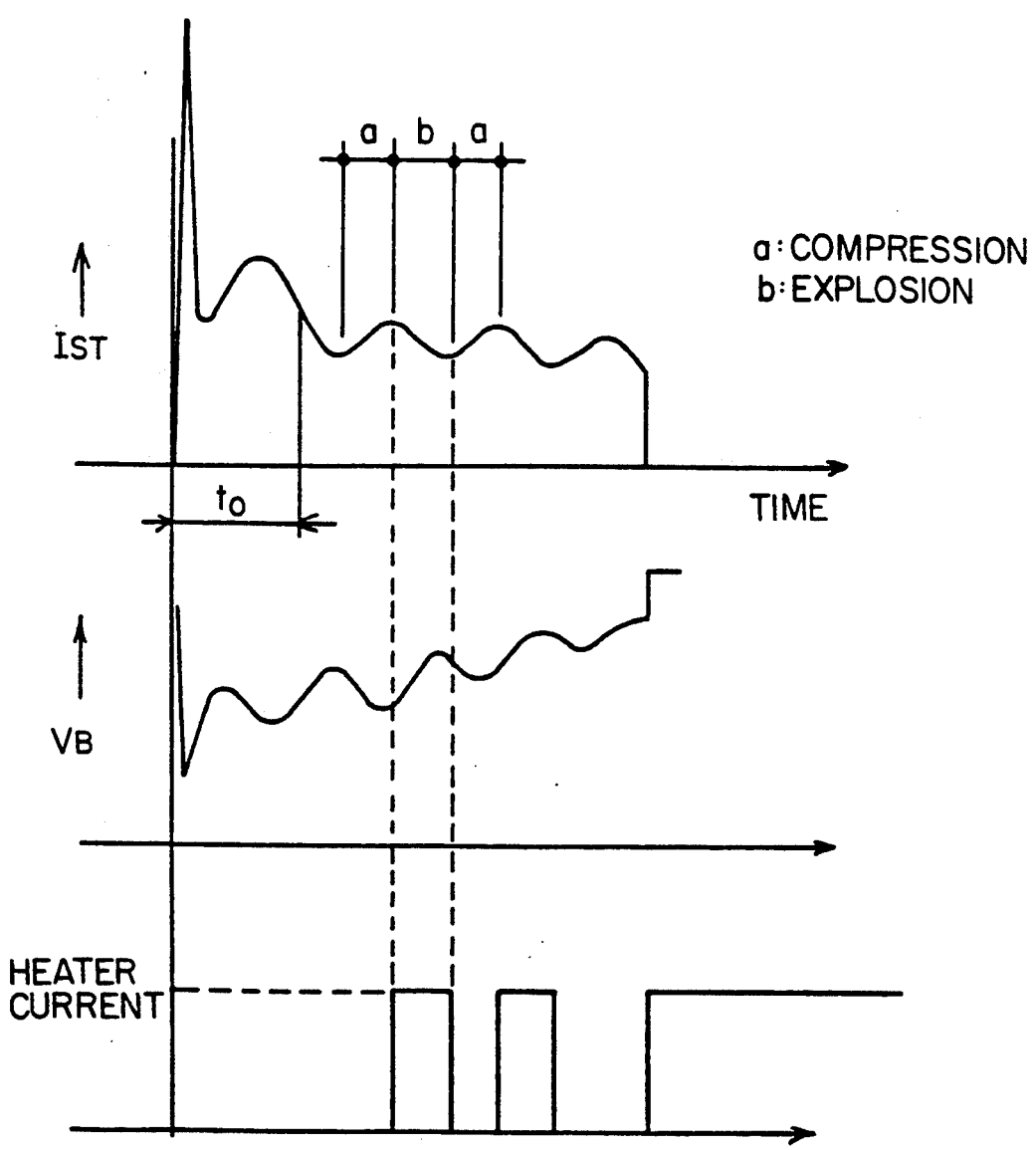
FIG. 6 is a characteristics curve showing the state of the electric current and voltage at the time of starting.

FIG. 6 shows a relation between the starter motor current IST and the battery voltage VB at the time of starter motor operation. In this drawing, since excess starting current flows due to the effect of engine oil viscosity and locked current during a period to immediately after starting, the control circuit 40 shown for example in FIG. 2 flows into the heater 20 with a delay of a specific time after the starting of the starter motor. As a result, the excessive current discharge of the battery likely to be caused by excessive starting current and heater current can be prevented and accordingly a large drop of the battery terminal voltage can be prevented. It is, therefore, possible to eliminate the fears of malfunction of electrical loads on the vehicle which are operating on the battery voltage.

Figure 7:
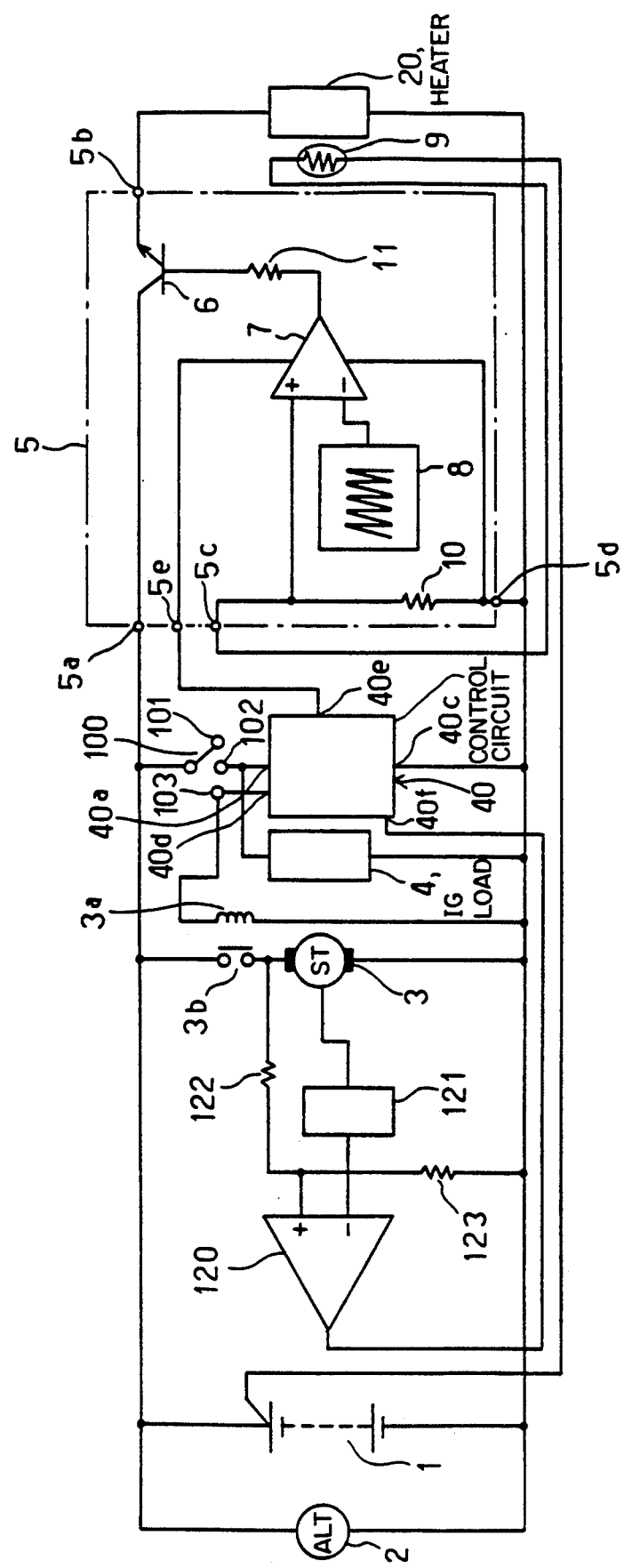
FIGS. 7 and 8 are block diagrams of the fifth embodiment according to the present invention.

One exemplary embodiment shown in FIG. 7 will be explained. A numeral 120 refers to a comparator; a numeral, 121, an F/V converter; and numerals 122 and 123, resistors.

When the starter contact 3b is closed, the voltage is applied to a - input terminal of the comparator 120. On the other hand, the F/V converter 121 is a known circuit, which produces the electric voltage proportional to the number of revolutions of the starter motor 3. Consequently, when the starter motor 3 is at a stop or is running at a low speed, the output voltage of the F/V converter 121 is low, and the output of the comparator 120 changes to the "1" level, inhibiting the operation of the control circuit 40.

In addition, the disclosed embodiment can be varied by monitoring the number of revolutions of an engine (not illustrated) in place of the number of revolutions of the starter motor described above.

Furthermore, since the current of the starter motor decreases upon the starting of rotation of the starter motor with a maximum starting current, the operation of the control circuit 40 may be inhibited until detecting a specific number of revolutions (for example 10 revolutions), by counting the number of pulses generated, for example at a rate of one pulse per revolution, in proportion to the number of revolutions of the starter motor, as opposed to detecting the number of revolutions of the starter motor by the F/V converter.

The operation of the control circuit 40 may also be controlled by detecting the number of revolutions of the starter motor as the number of pulses, and by also detecting the engine temperature (for example engine cooling water temperature. Specifically, the operation of the control circuit 40 can be inhibited in accordance with the engine temperature by increasing the number of pulses to be detected when the engine temperature is low, and conversely by decreasing the number of pulses that need to be detected when the engine temperature is high.

That is to say, at a low engine temperature, the viscosity of engine oil, etc. is high and the current of the starter motor will not immediately decrease after the starting of the engine, and accordingly it is possible to operate the control circuit, after decreasing the current of the starting motor, by increasing the number of pulses that need to be detected before the control circuit is no longer inhibited.

On the other hand, when the engine temperature is high, the engine oil, etc. has low viscosity and therefore the current of the starter motor decreases immediately after the starting of the engine, and therefore it is possible to operate the control circuit quickly by reducing the number of pulses that need to be detected.

Also, in the arrangement shown in FIG. 3, the operation of the fuel supply circuit 200 for operating the engine is inhibited for the time to, and allowed after the starter motor has started turning, thereby enabling the reduction of unburned fuel to be discharged.

Furthermore, the present invention has an additional advantage. Referring to FIG. 6, any battery voltage pulsation otherwise likely to occur during the period of operation of the starter motor 3 can be prevented by supplying the current to the heater 20 during the period of explosion of the engine in which the load on the starter motor is reduced.

Furthermore, in the third embodiment of FIG. 4, a constant-current charging circuit including the transistor 61 is connected in series with the battery 30, thereby preventing the flow of excessive charging current when the battery 30 is in parallel connection with the battery 1. According to the above-described arrangement, when battery charge is performed with the battery 30 connected in parallel, the terminal voltage of the battery 30 becomes lower due to a voltage drop (−2 V) caused by the transistor 61 and the resistor 64 as compared with the battery 1; consequently, when the output voltage of the generator 2 is set at 14.5 V, the terminal voltage of the battery 30 will become 12.5 V, resulting in an insufficiently charged battery. It is, therefore, possible to perform complete charge by setting the terminal voltage of the battery 30 at 10 V, about 2 V lower than the terminal voltage of the battery 1.

An example utilizing the operation of the IG.SW has been explained in each of the above-described embodiments; in this case, a signal produced by detecting a driver's seating on the seat and a signal of detection of a shift lever position may be added to an IG.SW operation detecting signal, and used as an engine starting means for obtaining a signal pertaining to the starting of the engine.

Fifth Embodiment

FIGS. 8 to 12 show a fifth embodiment of the present invention.

Figure 8:
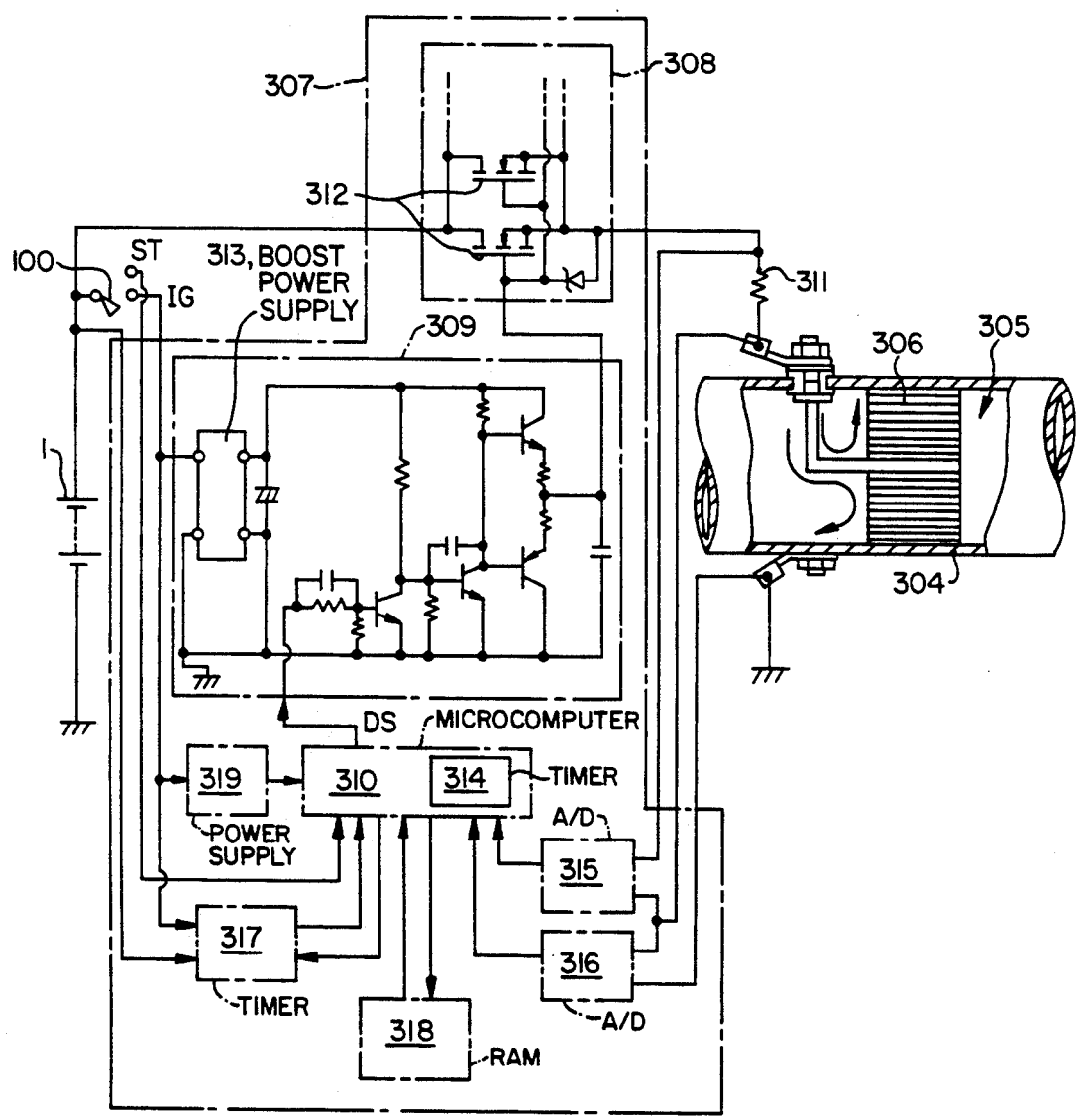
Figure 10:
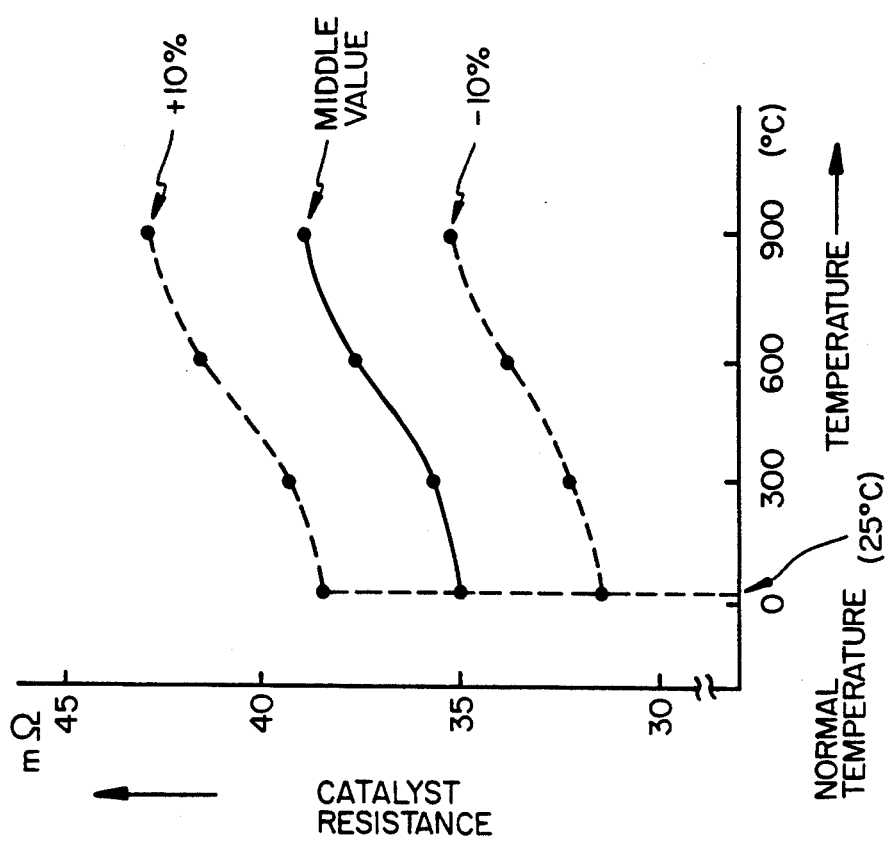
FIG. 10 is a graph showing a relationship between a value of resistance and temperature of the sheet metal.

FIG. 8 discloses a catalyst (hereinafter referred to as the "metallic-support catalyst") 305 is mounted in an exhaust pipe 304 of the engine (not illustrated) for cleaning up the exhaust gas. This metallic-support catalyst 305 is of such a construction that a thin coat of catalyst substance is applied for example on the surface of a honeycomb-like support and the catalyst support thus coated with the catalyst is fixed on the surface of a heat-resistant sheet metal 306 such as a stainless steel sheet. The sheet metal 306 used for the metallic-support catalyst 305, having electric resistance, is heated when the current flows through it. This sheet metal 306, therefore, is used as a heating element.

Figure 9:
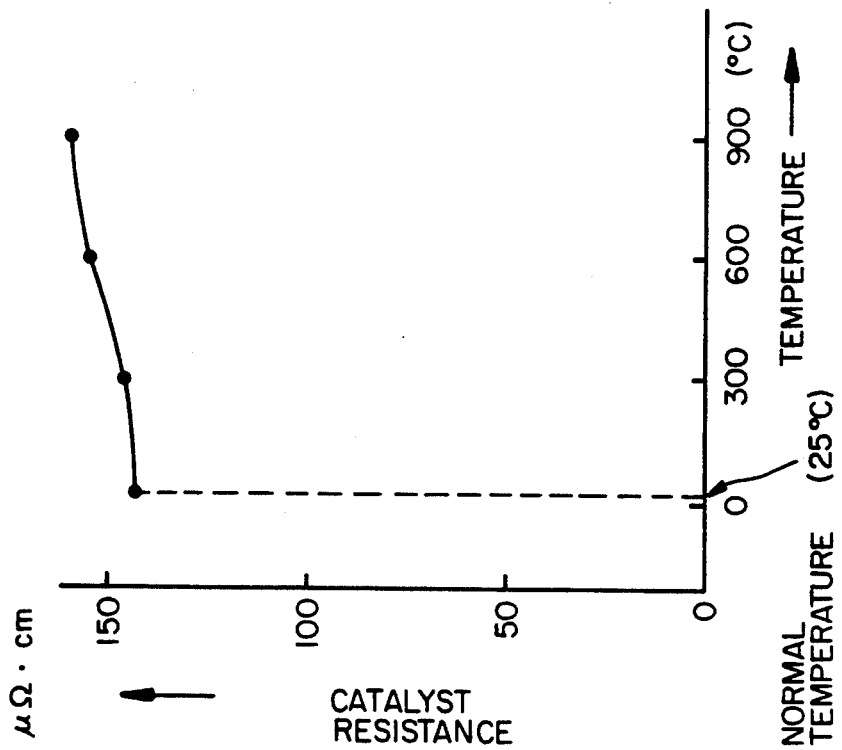
FIG. 9 is a graph showing a relationship between the volume resistivity and temperature of a sheet metal.

In FIG. 9, the full line indicates a relation between the volume resistivity and temperature of the stainless steel constituting the sheet metal 306. Also, the full line in FIG. 10 indicates a relation between the electric resistance value and temperature when the sheet metal 306 of stainless steel is used. And the broken line in FIG. 10 indicates a relation between the resistance value and temperature when the resistance value has varied within the range of +10%.

FIG. 8 also discloses is a conduction control device 307 for controlling the supply of the electric power to the sheet metal 306 of the metallic-support catalyst 305. The conduction control device 307 starts operating when the key switch 100 is connected to the ST terminal or the IG terminal, controlling the electric power to be supplied to the sheet metal 306 from the battery 1 which is a power source for the motor vehicle. That is, the conduction control device 307 is an electric circuit which supplies the electric power to the sheet metal 306 to quickly raise catalyst temperature to a specific temperature (target eating temperature) within a few seconds when the key switch 100 is connected to the ST terminal or the IG terminal, and limits the power supply to the sheet metal 306 once the target heating temperature is reached, thus maintaining the catalyst temperature in the vicinity of the target heating temperature. This conduction control device 307 has a power switch 308, a driver 309, and a microcomputer 310 which functions as a resistance measuring means and a temperature calculating means, which will be explained in order. The key switch 100 is provided with the ST terminal which is connected (ON) to supply the current to the engine starting device (not illustrated) at the time of engine starting, in addition to the IG terminal which is connected (ON) when the engine is running, and supplies the current to the engine ignition system (not illustrated). A resistor 311 inserted in the power supply line of the sheet metal 306 is a shunt resistor for measuring the current to be supplied to the sheet metal 306.

The power switch 308 is composed of switching element 312, such as a MOSFET, for controlling the supply of the electric power to the sheet metal 306. The switching element 312 of the present embodiment includes a plurality of n-channel power MOSFET's arranged in parallel to provide a great power supply capacity.

The driver 309 is a pre-driving circuit for turning on the switching element 312 to be used. In the power supply section of the driver 309 connected to the IG terminal of the key switch 100 is mounted a boost power supply section 313 for applying a higher voltage than that of the battery 1 to the gate of FET for the purpose of closing the n-channel power MOSFET circuit.

The microcomputer 310 carries out operations for finding an electric resistance value of the sheet metal 306 from the current flowing in the sheet metal 306 and the voltage applied to both ends of the sheet metal 306, and for obtaining the temperature of the sheet metal 306, that is, the temperature of the catalyst, from the resistance value thus obtained. Furthermore the microcomputer 310 outputs to the driver 309 a signal (DS signal) for turning on and off the switching element 312 of the power switch 308 in accordance with the catalyst temperature which is a result of computer operations.

Furthermore the microcomputer 310 has a built-in timer 314 which starts counting at the time of engine starting to hold the operation time of the conduction control device 307 within a specific time (operation time).

The microcomputer 310 is equipped with an external current-detecting A/D converter 315 for calling, into the microcomputer 310, the value of the current flowing in the sheet metal 306. The microcomputer 310 is also externally provided with an external current-detecting A/D converter 316 for calling, into the microcomputer 310, the value of the voltage applied to the sheet metal 306.

The microcomputer 310 is provided with an external digital timer 317 operating without connection with the key switch 100. This external timer 317 is a stopping time measuring means for measuring an elapsed time after the IG terminal of the key switch 100 is turned off, that is, the length of time the engine stops. This external timer 317 functions to send the elapsed time thus measured, to the microcomputer 310 in accordance with a command signal from the microcomputer 310. In the present embodiment the external timer 317 is not built in the microcomputer 310, and the timer for measuring the engine stopping time is also installed outside of the microcomputer 310, but may be installed in the microcomputer 310.

The microcomputer 310 is externally equipped with a reloadable memory (RAM) 318. The reloadable memory 318 is a storage means for storing the resistance value of the sheet metal 306 when the catalyst is at a normal temperature. It functions to sent stored data to the microcomputer 310 and to reload the stored data in accordance with a signal from the microcomputer 310. In the present embodiment, the memory 318 is installed outside of the microcomputer but may be built inside.

The microcomputer 310 operates on the power supplied from the power supply section 319 connected to the IG terminal of the key switch 100.

Figure 11:
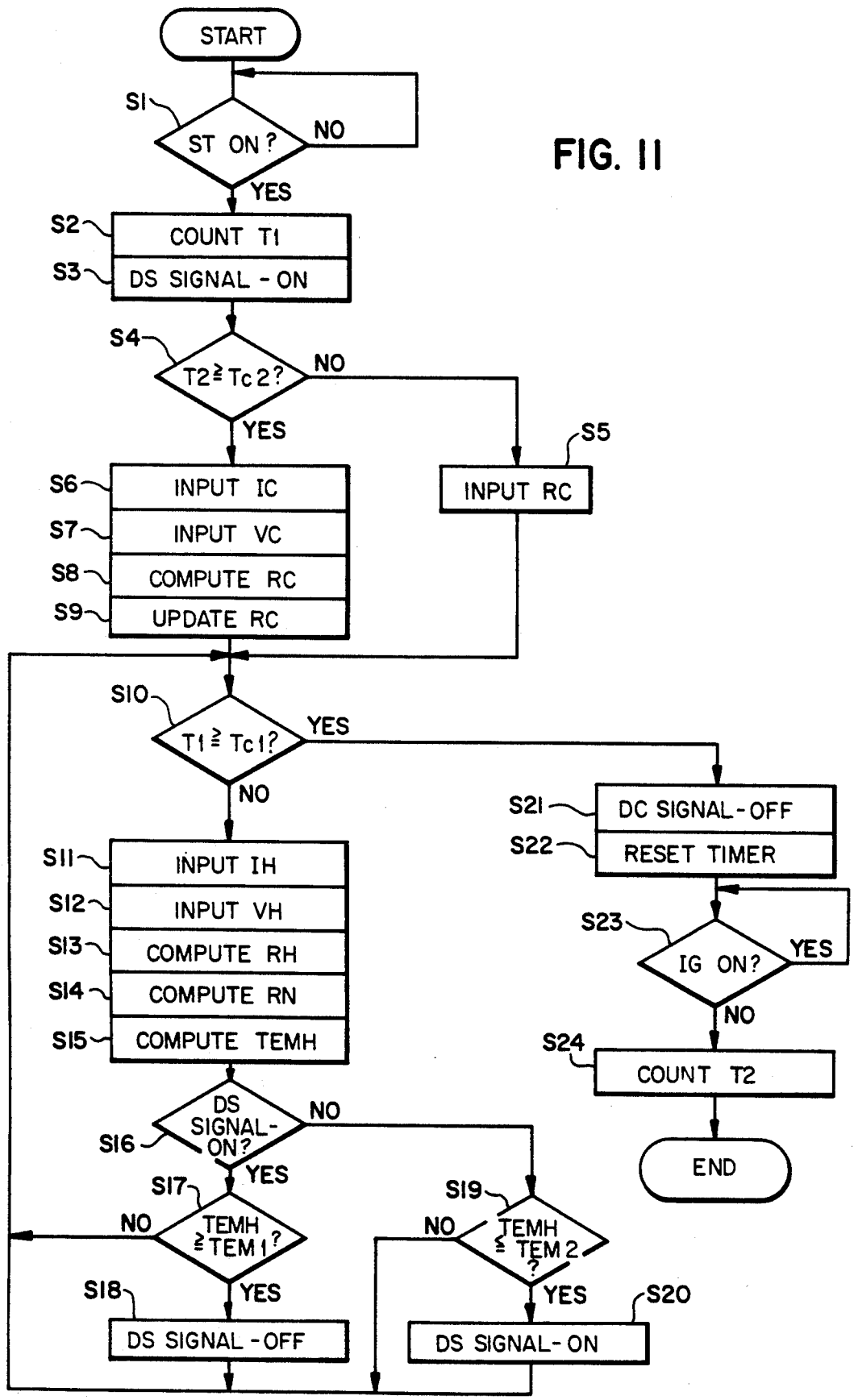
FIG. 11 is a flowchart showing one example of operation of a microcomputer.

Next, one example of operation of the microcomputer 310 will be explained by referring to the flowchart of FIG. 11. The microcomputer 310 in the present embodiment is so provided as to compute a difference between a resistance value at normal temperature and a measured resistance value (variation in the resistance value), so that the temperature of the catalyst will be calculated from this resistance value (variation), and that the supply of the current to the sheet metal 306 will be controlled by the calculated temperature. The microcomputer 310 in the present embodiment is provided also to judge the catalyst to be at a normal temperature when the stopping time of the engine counted by the external timer 317 exceeds a specific time (time judged at normal temperature), and to update the resistance value at the normal temperature stored in the memory 318 to the resistance value at the time of engine starting.

When the key switch 100 is connected to the IG terminal (START), whether or not the key switch 100 has been connected to the ST terminal will be decided (Step S1). When a result of this decision is NO, the program goes back to Step S1. Conversely when the result of the decision is YES, the built-in timer 314 starts counting the operation time T1 of the conduction control device 307 (Step S2). Subsequently, the switching element 312 of the power switch 308 is turned to ON, outputting a DS signal "ON" to supply a great current to the sheet metal 306 (Step S3).

Subsequently a check is made whether or not the engine stopping time T2 counted by the external timer 317 exceeds the predetermined time Tc2 (preset to a value above a time required by the catalyst to cool down to the normal temperature, for example five hours) (Step S4). When a result of this decision at Step S4 is NO, the microcomputer decides the catalyst to be not at a normal temperature, inputting the previously updated past data (the resistance value RC at normal temperature) stored in the memory 318 (Step S5). When the result of decision at Step S4 is YES, the microcomputer decides that the catalyst is at the normal temperature, and begins inputting, from the current-detecting A/D converter, the current IC flowing into the sheet metal 306 (Step S6). Subsequently, the voltage VC to be applied to the sheet metal 306 is inputted from the voltage-detecting A/D converter 316 (Step S7). Next, the resistance value RC of the sheet metal 306 at the normal catalyst temperature is calculated from the current IC and the voltage VC that have been inputted (Step S8). Then the resistance value RC at the normal temperature is stored in the memory 318, thus updating the previous resistance value RC at the normal temperature (Step S9).

After the execution of Step S5 or S9, a decision is made on whether or not the operating time T1 of the conduction control device 307 exceeds the preset time Tc1 (a time required by the exhaust gas to raise the catalyst temperature to a proper temperature, for example 20 seconds) (Step S10). When a result of the decision at Step S10 is NO, the current IH flowing into the sheet metal 306 is entered from the current-detecting A/D converter 315 (Step S11). Subsequently, the voltage VH applied to the sheet metal 306 is entered from the voltage-detecting A/D converter 316 (Step S12). Next, from the current IH and the voltage VH thus entered, the current resistance value RH of the sheet metal 306 is calculated out (Step S13). Then, calculations are made of the current resistance value RH, the resistance value RC at normal temperature, and a variation RM of the current resistance value (Step S14). Subsequently, the catalyst temperature TEMH is calculated out from a map of relation among the calculated variation RN, the variation of resistance value stored in the microcomputer 310, and a value of temperature rise (Step S15).

Subsequently, whether the DS signal "ON" is outputted to the driver 309, that is, whether the sheet metal 306 is live, is decided (Step S16). When a result of this decision is YES, a decision is made on whether the current catalyst temperature TEMH has reached the preset conduction stop temperature TEM1 (for example 355C) (Step S17). When a result of this decision at Step S17 is NO, it is judged that the catalyst temperature is lower than the proper temperature, thus returning to Step S10 while continuing the supply of the current to the sheet metal 306. Conversely, when the result of decision of Step S17 is YES, it is judged that the catalyst has been heated up to a suitable temperature, the DS signal "OFF" being outputted to the driver 309 to stop the supply of the current to the sheet metal 306 (Step S18). Thereafter the program goes back to Step S10. When the result of decision at Step S16 is NO, a decision is made on whether or not the present catalyst temperature TEMH is below a preset conduction start temperature TEM2 (for example 345C) (Step S19). When a result of this decision at Step S19 is NO, it is judged that the catalyst temperature has reached the proper temperature, and the program goes back to Step S10 with the supply of the current to the sheet metal 306 kept stopped. When the result of decision at Step S19 is YES, the catalyst temperature is judged as has not reached the proper temperature. Accordingly the DS signal "ON" is outputted to the driver 309 to supply the current to the sheet metal 306 (Step S20), and thereafter the program goes back to Step S10.

When the result of decision at Step S10 described above is YES, it is judged that the catalyst temperature is kept at the proper temperature by the exhaust gas flowing in the exhaust pipe 304 if the current supplied to the sheet metal 306 is not controlled by means of the conduction control device 307. Consequently, the DS signal "OFF" is outputted to the driver 309 to stop the current flowing to the sheet metal 306 (Step S21). Subsequently, the internal timer is reset (Step S22). Thereafter, a decision is made on whether or not the key switch 100 has been turned to ON to close the IG terminal (Step S23). When the result of this decision is YES, the program goes back to Step S23. Conversely, when the result is NO, the external timer 317 is reset, starting counting to start the measurement of the engine stopping time T2 (Step S24) and ending the program.

Next, the operation of the above-described embodiment will be briefly explained with reference to the time chart of FIG. 12.

When the key switch 100 is operated for connection with the IG terminal or the ST terminal (time Ta), the conduction control device 307 starts, first turning on the power switch 308 to supply the current to the sheet metal as indicated by the full line A in FIG. 12. Then, the temperature of the sheet metal 306, that is, the temperature of the metallic-support catalyst 305, rises fast as indicated by the full line A in FIG. 12. With the start of current supply to the sheet metal 306, the microcomputer 310 carries out calculations of resistance of the sheet metal 306 every specific time (for example every 10 ms–100 ms), determining a variation in the resistance from resistance at normal temperature and the calculated resistance to obtain the current temperature of the catalyst. When the catalyst temperature thus obtained has reached the conduction stop temperature TEM1 (time Tb), the conduction control device 307 turns off the power switch 308, stopping the current flowing into the sheet metal 306. When the catalyst temperature calculated by the microcomputer 310 has lowered to the conduction start temperature TEM2 (time Tc), the power switch 308 is turned to ON to supply the current again to the sheet metal. Repeating the above-described control keeps the catalyst at a specific temperature (proper temperature) even during the initial period of engine starting.

After the engine starts, the metallic-support catalyst 305 is heated with the exhaust gas. After the power supply to the sheet metal 306 is stopped, the temperature of the metallic-support catalyst 305 gradually lowers. Consequently the conducting interval of the sheet metal 306 gradually extends.

When the operation time of the conduction control device 307 is over, the conduction control device 307 stops controlling the current supply to the sheet metal 307.

In the present embodiment the metallic-support catalyst 305 is not provided with a means for temperature measurement. It is possible to directly know the temperature of the metallic-support catalyst 305 from a variation in the resistance of the sheet metal 306 from that at normal temperature. The temperature of the catalyst, therefore, can be seen with good response as compared with prior-art techniques for measuring the catalyst temperature by means of a temperature sensor such as a thermocouple that has been heat-treated, thereby preventing the supply of unnecessarily heavy current to the sheet metal 306 so that the sheet metal 306 will never be overheated, and enabling prolonging the life of the sheet metal 306. It is also possible to prevent supplying more current than needed to the sheet metal 306, thereby enabling preventing excessive power consumption.

The metallic-support catalyst 305 added with a temperature detection means such as a thermocouple is hard to be securely installed on the sheet metal 306. In the present invention, however, the metallic-support catalyst 305, having no newly added means for measuring the catalyst temperature, will not be subjected to mechanical load for the detection of the catalyst temperature.

The metallic-support catalyst 305 added with the temperature detection means such as the thermocouple has the disadvantage that the passage resistance of the exhaust gas increases. In the present invention, however, the metallic-support catalyst 305 is not provided with a means for temperature measurement, and therefore has not such a disadvantage that the passage resistance of the exhaust gas increases.

The resistance at normal temperature is stored after updating at the time of cold starting, and therefore the temperature of the metallic-support catalyst 305 is accurately measured and the supply of the current is accurately controlled if there takes place a variation in the resistance in the course of manufacture of the metallic-support catalyst 305 or due to oxidation or partial fracture of the sheet metal 306.

Sixth Embodiment

Figure 13:
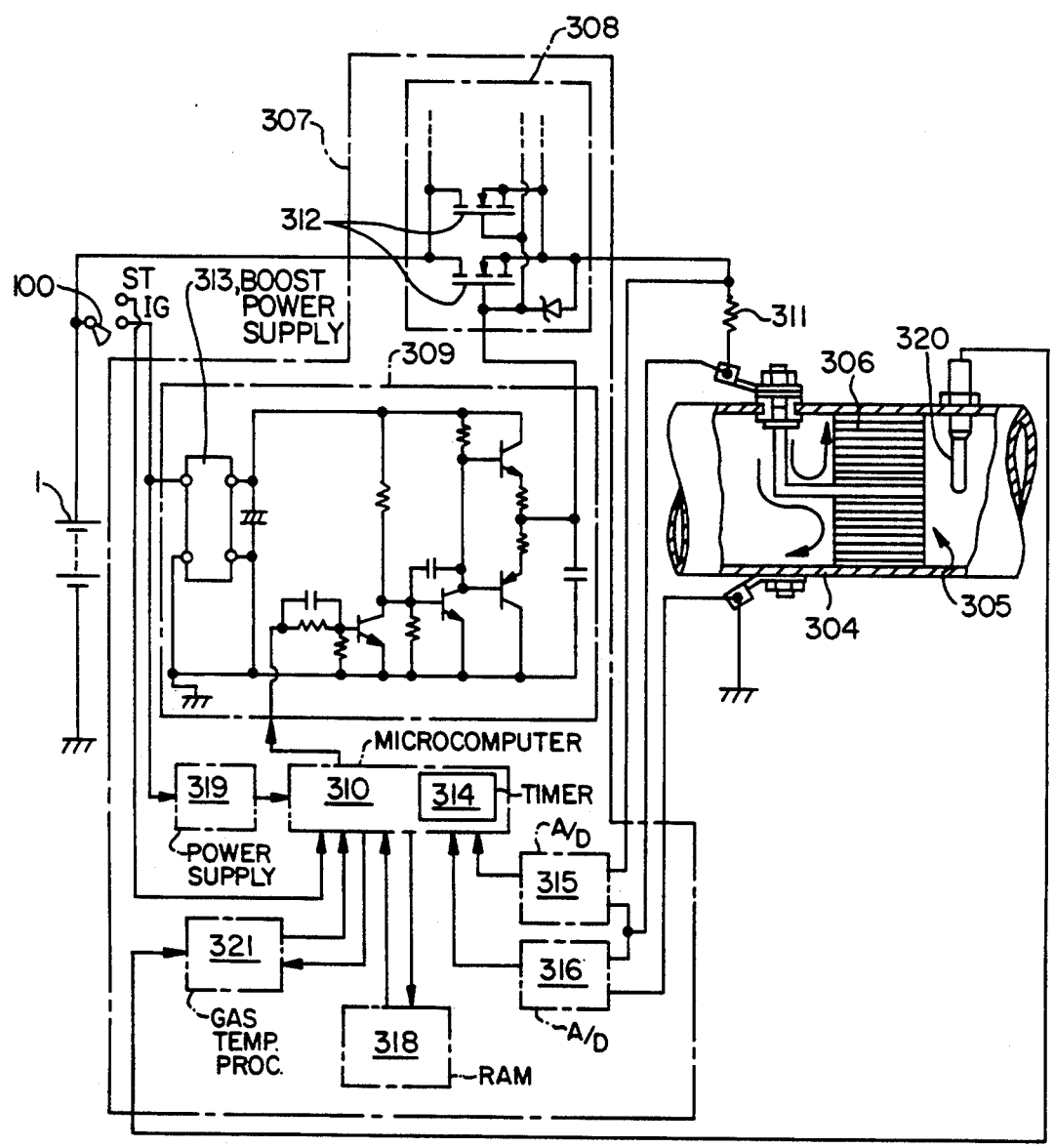
FIG. 13 is a block diagram of the sixth embodiment according to the present invention.

FIG. 13 is a block diagram showing the arrangement of the conduction control device 307 of the metallic-support catalyst 305 of the sixth embodiment.

The present embodiment is provided with a thermistor-type exhaust gas temperature sensor (a temperature detection means) 320 for measuring the temperature of the catalyst, in the exhaust pipe 304 mounted near the metallic-support catalyst 305. The conduction control device 307 is provided, in place of the external timer of the above-described embodiment (a reference numeral 317 of the fifth embodiment), with a gas temperature processing section 321 for measuring temperatures in the vicinity of the metallic-support catalyst 305. The microcomputer 310 of the present embodiment judges the catalyst as being at the normal temperature if the temperature in the vicinity of the metallic-support catalyst 305 to be measured by the exhaust gas temperature sensor is lower than a preset temperature (a reference normal temperature), and updates the value of resistance at the normal temperature to be stored in the memory 318 to the value of resistance at the time of engine starting.

In the fifth and sixth embodiments described above, temperatures were calculated out from the value of resistance, and the flow of the current to the sheet metal 306 is controlled in accordance with the temperatures thus calculated. However, since the value of resistance and temperature have a relative relation, the conduction control device 307 may be installed so as to control the flow of the current to the sheet metal 306 directly by the value of resistance without temperature calculation. That is, the control device may be installed so as to control the sheet metal 306 in accordance with a variation in the value of resistance at the normal temperature and higher. Furthermore there has been given an example of measurement of an engine stopping time determined by measuring the elapsed time after the IG terminal of the key switch 100 is turned off; however, the engine stopping time may be measured after opening the circuit which is intermittently opened by opening the IG terminal of the key switch 100. Furthermore, there has been given the example that the temperature in the vicinity of the catalyst is measured to judge whether or not the catalyst is cold, but whether or not the catalyst is cold may be judged by directly or indirectly detecting the engine coolant temperature and the temperature of such members as the engine body relative to the catalyst temperature.

Furthermore, there has been given an example using the shunt resistance as a means for measuring the current supplied to the sheet metal 306, but other current detecting means as a Hall element may be applied.

The present invention has been described in detail with particular reference to preferred embodiments thereof but it will be understood that variations and modifications can be effected within the spirit and scope of the invention.

What is claimed is:

1. A driving apparatus for controlling an electric load on a vehicle, comprising:
  a starter motor operating on electric power from a battery to start an engine;
  specific electrical loads operating on the electric power from said battery when said starter motor is operating;
  a starter motor operation detecting means for detecting the operating condition of said starter motor;
  a battery discharge condition detecting means for detecting a discharging condition of said battery during the operation of said starter motor; and
  a current quantity control means for controlling an amount of current flowing to said specific electrical loads, in accordance with the discharging condition of said battery, so that current flowing to said starter motor will take precedence;
  wherein said current quantity control means decreases the amount of the current flowing to said specific electrical loads in accordance with voltage drop of said battery.

2. A driving apparatus for controlling an electric load on a vehicle, comprising:
  a starter motor operating on electric power supplied from said battery to start an engine;
  specific electrical loads operating on the electric power from said battery during starter motor operation; and
  a conduction timing control means for delaying a supply of current to said specific electrical loads in relation to a supply of current to said starter motor.

3. A driving apparatus for controlling a electric load on a vehicle as claimed in claim 2, wherein said conduction timing control means starts the supply of the current to said specific electrical loads a first specific period of time after a start of operation of said starter motor.

4. A driving apparatus for controlling a electric load on a vehicle as claimed in claim 3, wherein said conduction timing control means stops the supply of the current to said specific electrical loads after a second specific period of time exceeding said first specific period of time.

5. A driving apparatus for controlling an electric load on a vehicle, comprising:
  an electric heater mounted to a catalyst for cleaning up exhaust gases from an engine;
  a first and a second battery connected in series for supplying electric power to said electric heater;
  a starter motor driven by said first battery to start said engine;
  a boosting means for boosting voltage of said first battery and charging said second battery with the voltage thus boosted;
  a starter motor operation detection means for detecting an operating condition of said starter motor;
  a battery discharge condition detection means for detecting a discharge condition of said first battery during operation of said starter motor; and
  a current quantity control means for controlling an amount of current supplied to said electric heater so that a supply of current to said starter motor will take precedence, in accordance with the discharge condition of said first battery detected by said battery discharge condition detection means.

6. A driving apparatus for controlling an electric load on a vehicle, comprising:
  a starter motor operating on electric power from a battery to start an engine;
  a catalyst for cleaning up exhaust gases, comprising a sheet metal and a catalytic substance attached to a surface of said sheet metal, said sheet metal being supplied with the electric power from said battery during the operation of said starter motor, said sheet metal thereby being heated to raise a temperature of said catalytic substance;

a resistance measuring means for measuring electric resistance of said sheet metal; and a conduction control means for controlling the supply of current to said sheet metal to hold said catalytic substance at a specific temperature in response to the value of resistance detected by said resistance measuring means.

7. A driving apparatus for controlling an electric load on a vehicle as claimed in claim 6, wherein said conduction control means calculates an amount of variation of resistance based on the value of resistance of said sheet metal at a normal temperature of said catalyst, said conduction control means controlling the supply of the current to said sheet metal in accordance with the variation in the value of resistance.

8. A driving apparatus for controlling an electric load on a vehicle as claimed in claim 7, wherein said conduction control means comprises a memory and a stop time measuring means for detecting a stop of operation of said engine to measure a stop time of said engine, said conduction control means controlling said memory such that if the time measured by said stop time measuring means exceeds a predetermined time, the value of resistance at normal temperature to be stored in said memory will be converted into a value of resistance of said sheet metal at the time of engine starting.

9. A driving apparatus for controlling an electric load on a vehicle as claimed in claim 7, wherein said conduction control means comprises a memory and a temperature detection means for detecting temperature in a vicinity of said catalyst, said conduction control means changing the value of resistance at normal temperature to be stored by said memory to a value of resistance of said sheet metal at a time of engine starting if a temperature detected by said temperature detection means is lower than a specific value.

* * * * *